United States Patent
Benanti et al.

(10) Patent No.: US 9,133,380 B2
(45) Date of Patent: *Sep. 15, 2015

(54) POLYESTER LUBRICANT FOR WORKING FLUIDS COMPRISING DIFLUOROMETHANE

(71) Applicant: Chemtura Corporation, Middlebury, CT (US)

(72) Inventors: Travis Benanti, Farmington, CT (US); Edward T. Hessell, Fairfield, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,058

(22) Filed: Feb. 14, 2013

(65) Prior Publication Data

US 2013/0207023 A1    Aug. 15, 2013

Related U.S. Application Data

(60) Provisional application No. 61/598,980, filed on Feb. 15, 2012.

(51) Int. Cl.
*C09K 5/04*     (2006.01)
*C10M 171/00*   (2006.01)

(52) U.S. Cl.
CPC ............ *C09K 5/045* (2013.01); *C10M 171/008* (2013.01); *C09K 2205/24* (2013.01); *C10M 2207/2835* (2013.01); *C10N 2220/302* (2013.01); *C10N 2230/70* (2013.01); *C10N 2240/30* (2013.01)

(58) Field of Classification Search
CPC ................. C10M 2207/2835; C10N 2230/70; C10N 2240/30
USPC ............................................ 252/68; 508/485
See application file for complete search history.

(56) References Cited

U.S. PATENT DOCUMENTS

| 3,670,013 | A  | 6/1972  | Leibfried          |
|-----------|----|---------|--------------------|
| 5,486,302 | A  | 1/1996  | Short              |
| 6,444,626 | B1 | 9/2002  | McHenry et al.     |
| 6,774,093 | B2 | 8/2004  | Carr et al.        |
| 2010/0190672 | A1* | 7/2010 | Carr et al. ............... 508/485 |
| 2011/0240910 | A1* | 10/2011 | Carr et al. ............... 252/68 |

* cited by examiner

*Primary Examiner* — John Hardee
(74) *Attorney, Agent, or Firm* — Dilworth IP LLC

(57) ABSTRACT

Mixtures of select neopentyl polyol esters are found to be highly miscible with the refrigerant R-32 over a wide temperature range. Working fluids are provided comprising R-32 and a lubricant containing these select neopentyl polyol esters and having a kinematic viscosity at 40° C. of 32 cSt or higher. Specifically, the lubricant composition of the invention comprises a mixture of alkylcarboxy esters of neopentyl polyols, wherein at least 10 wt % of all neopentyl polyol esters are esters of pentaerythritol oligomers of 4 or more pentaerythritol monomer groups, and wherein a majority of the alkylcarboxylate groups of the alkylcarboxy esters of neopentyl polyols are pentanoyl groups wherein at least 15% of the pentanoyl groups are branched.

15 Claims, No Drawings

POLYESTER LUBRICANT FOR WORKING FLUIDS COMPRISING DIFLUOROMETHANE

This application claims benefit under 35 USC 119(e) of U.S. provisional application No. 61/598,980, filed Feb. 15, 2012, the disclosure of which is incorporated herein by reference.

Provided are working fluids, suitable for heat transfer devices including refrigeration and air conditioning systems, said working fluid comprising a hydrofluorocarbon refrigerant, i.e., difluoromethane, also called R-32, and a polyol ester lubricant composition having a kinematic viscosity at 40° C. of from about 32 to about 120 cSt comprising linear and branched $C_{5-10}$ alkylcarboxy esters of a mixture of neopentyl polyols, wherein at least 10 wt % of all neopentyl polyol esters are esters of pentaerythritol oligomers of 4 or more pentaerythritol monomer groups, and a majority of the alkylcarboxylate groups of the alkylcarboxy esters of neopentyl polyols are pentanoyl groups wherein 15 to 45% of the pentanoyl groups are branched. In one particular embodiment, the working fluid comprises difluoromethane as the predominate or sole refrigerant.

Heat transfer devices such as refrigerators, freezers, heat pumps and air conditioning systems are well known. In simple terms such devices operate via a cycle wherein a refrigerant of a suitable boiling point evaporates at low pressure taking heat from its surroundings, the vapor passes to a condenser where it condenses back to a liquid and gives off heat to its new surroundings, and then the condensate is returned to the evaporator completing the cycle. In addition to the mechanical parts of a refrigeration device such as a compressor etc., especially suited materials are needed including the refrigerant, suitable heat transfer materials, sealants to prevent loss of refrigerant and lubricants to allow for functioning of the movable parts of the device.

For example, a sufficient amount of the lubricant in the compressor to provide lubrication and sealing is desirable. The lubricant provides protection against wear of moving parts such as bearings under load, removes heat from the compressor, aids in preserving seals to prevent loss of refrigerant, seals clearances to ensure efficient compression of gas from low to high pressure and can be used to reduce noise (dampening).

The lubricant needs to have good low temperature flow properties and be thermally stable. It is also necessary for a refrigeration lubricant to be compatible with the refrigerant. For example, in dealing with the compressor, the lubricating fluid is thought of as a solution of refrigerant dissolved in the lubricant. In other parts of the refrigerating system such as the evaporator, the oil may be thought of as lubricant dissolved in the refrigerant. Generally, it is desirable to have a high degree of miscibility between the lubricant and the refrigerant over the operating conditions (temperatures and pressures) of the entire refrigeration system and partial miscibility may cause problems with heat transfer and may also interfere with the return of oils to the compressor.

For example, the evaporator is the coldest part of the system and is a likely place for phase separation to occur, but the working fluid containing the lubricant must also perform at the higher temperatures encountered elsewhere in the system.

Refrigerant and lubricant combinations are therefore classified as completely miscible, partially miscible, or immiscible depending on their degree of mutual solubility. Partially miscible mixtures of refrigerant and lubricants are mutually soluble at certain temperatures and lubricant-in-refrigerant concentrations, and separate into two or more liquid phases under other conditions.

Concerns about ozone depletion and global warming have lead to replacement of traditional chlorofluorocarbon refrigerants with new or alternate materials. One example of an alternative to chlorofluorocarbon refrigerants, difluoromethane, is a highly efficient refrigerant without the harmful ozone depletion properties of chlorofluorocarbons. There are however technical hurdles that must be overcome in order to make full use of this highly desirable refrigerant.

The refrigerant R-32, i.e., difluoromethane, is a hydrofluorocarbon (HFC) with an ozone depleting potential (ODP) of 0 and a global warming potential (GWP) of 650. R-32 however is moderately flammable, but more importantly, insufficiently miscible with lubricants having the properties required for use in today's heat transfer systems. To overcome these technical hurdles, R-32 is used in blends, e.g., R-140A is an azeotropic (50%150%) w/w mixture of difluoromethane (R-32) with pentafluoroethane (R-125); R-407A is an azeotropic mixture of difluoromethane with pentafluoroethane and tetrafluoroethane (R-134a). While overcoming some of the hurdles faced with R-32 when used alone, these blends are not as desirable from a performance or ecological point of view.

As stated, R-32 has a GWP of 650, which is considerably lower than that of refrigerant R-410A, GWP=2100. R-410A has been considered as the replacement for R-22 (chlorodifluoromethane) HCFC refrigerant which has an ODP of 0.055 and GWP of 1810. R-32 also has a 10% higher volumetric capacity than R-410A, leading to a higher coefficient of performance (COP).

There has been a recent resurgence in the development of refrigeration and AC equipment that can run exclusively on R-32. R-32 operates at a higher pressure than R-410A but improvements in equipment design with improved economics have made the use of R-32 a practical consideration. Improvements in engineering controls to minimize flammability hazards, R-410A is considered non-flammable (A1 rating) while R-32 is considered moderately flammable (A2 rating), as well as the growing acceptance of flammable hydrocarbon refrigerants (A3 rating) for some application have increased the possibility of R-32 becoming a mainstream next generation low GWP refrigerant for new equipment.

One remaining issue standing in the way of R-32 acceptance is that the synthetic lubricants currently used with R-410A are not entirely suitable for use with R-32. The most commonly used lubricants with R-410A are polyol esters and polyvinyl ethers. The current commercial lubricants do not have suitable miscibility/solubility with R-32 over the entire operating range of the refrigeration/AC systems, especially at the more desirable lubricant viscosities. R-32 based equipment also run at higher discharge temperatures which puts additional requirements for thermal stability on the lubricant.

Synthetic ester based lubricants are effective refrigeration lubricants in many systems. The physical properties of the ester mixtures, for example, viscosity and the like, are dependent on the types of esters and the ratio of the esters present.

U.S. Pat. No. 6,444,626 discloses formulated fluids well suited for use as a coolant or lubricant comprising mixtures of pentaerythritol, di-pentaerythritol, tri-pentaerythritol and tetra-pentaerythritol esters as well as mixtures with the aforementioned esters and trimethylol polyol esters. The mixtures of pentaerythritol and poly-pentaerythritol esters of U.S. Pat. No. 6,444,626 are prepared from a starting polyol which is predominately mono-pentaerythritol in a two step process following the general teaching of U.S. Pat. No. 3,670,013 by partially esterification the polyol under acidic conditions using less carboxylic acid than needed for full esterification under conditions that also lead to oligomerization of the polyol/ester. The following step completes the esterification of the hydroxy groups.

U.S. Pat. No. 5,486,302 discloses higher viscosity POE lubricants obtained by esterifying a polyol using branched chain carboxylic acids; unfortunately, these branched chain esters exhibit insufficient lubricity for use in certain heat transfer devices.

U.S. Pat. No. 6,774,093 discloses a refrigeration lubricant comprising esters similar to those of U.S. Pat. No. 6,444,626, but with a much higher viscosity making it suitable for use with fluorinated refrigerants such as R-410A.

Co-pending U.S. patent application Ser. No. 12/684,315 discloses refrigeration lubricants comprising mixtures of carboxy esters of mono-, di-, tri-, tetra- and higher oligomers of pentaerythritol, wherein at least 25% are esters of tetra-pentaerythritol or higher oligomers, useful with $CO_2$ as refrigerant. Co-pending U.S. patent application Ser. No. 13/080,739 also discloses high viscosity lubricants useful with $CO_2$, which contain predominately esters of straight chain $C_{3-6}$ linear carboxylic acids, for example, n-pentanoic acid esters, and which comprise 30 wt % or more of esters of pentaerythritol oligomers containing 4 or more pentaerythritol groups.

The relevant portions of above mentioned US patents and US patent applications are included herein by reference.

It has been surprisingly found that $C_{5-10}$ alkylcarboxy neopentyl polyol esters comprising a mixture of $C_{5-10}$ alkylcarboxy esters of pentaerythritol, di-pentaerythritol, tri-pentaerythritol and oligomers comprising 4 or more pentaerythritol monomers, wherein 50 mole % or more of all the $C_{5-10}$ alkylcarboxy neopentyl polyol esters are linear or branched $C_5$ alkylcarboxy esters, and 15-40% of all the $C_5$ alkylcarboxy esters are branched provide a lubricant base stock ideally suited for use with R-32 refrigerant. Said alkylcarboxylate esters, and their blends with selected polyol esters, not only have higher than expected viscosity and R-32 miscibility, but also have excellent lubricity, film building and load bearing properties.

SUMMARY OF THE INVENTION

The invention provides a working fluid suitable for heat transfer devices comprising difluoromethane, also called R-32, and a polyol ester lubricant composition with a kinematic viscosity at 40° C. of 32 cSt or higher, said lubricant composition comprising a mixture of alkylcarboxy esters of neopentyl polyols, wherein a majority, i.e., 50 mole % or more, of the alkylcarboxylate groups of the alkylcarboxy esters of neopentyl polyols are pentanoyl groups wherein at least 15% of the pentanoyl groups are branched, and at least 10 wt % of all neopentyl polyol esters are esters of pentaerythritol oligomers of 4 or more pentaerythritol monomer groups.

While other types of refrigerants may be present, hydrofluorocarbon, i.e., HFC, refrigerants make up the majority of all refrigerants presents, in many embodiments, the refrigerant is predominately or exclusively made up of HFC refrigerants. In many embodiments the working fluid comprises difluoromethane as the predominate refrigerant and in certain particular embodiments the refrigerant consists essentially of difluoromethane, i.e., any refrigerant other than difluoromethane is present only in amounts that do not materially affect the basic and novel characteristic(s) of the invention.

The pentaerythritol based polyol esters of the invention may be conveniently prepared by the general process found in the above cited US patents and patent applications. Polyol esters of the invention can also be prepared by simple esterification of one or more polyols and it is also common to blend separately prepared esters to arrive at the polyol ester mixture of the invention. For example, mixtures of pentaerythritol based polyol esters may be blended with, e.g., carboxylic acid esters of neopentyl glycol or trimethylol propane in order to adjust the viscosity of the lubricant composition.

DESCRIPTION OF THE INVENTION

A working fluid comprising:
i) a hydrofluorocarbon refrigerant comprising difluoromethane (R-32), and
ii) a polyol ester lubricant composition a kinematic viscosity at 40° C. of from about 32 to 120 cSt, e.g., about 32 to about 100 cSt comprising a mixture of $C_{5-10}$ alkylcarboxy neopentyl polyol esters, said neopentyl polyol esters comprising a mixture of $C_{5-10}$ alkylcarboxy esters of pentaerythritol, di-pentaerythritol, tri-pentaerythritol and oligomers comprising 4 or more pentaerythritol monomers, wherein at least 10 wt % of all neopentyl polyol esters are esters of oligomers containing 4 or more pentaerythritol polyol monomer units, and wherein 50 mole % or more of all the $C_{5-10}$ alkylcarboxy neopentyl polyol esters are linear or branched $C_5$ alkylcarboxy esters, and 15-45%, e.g. 15 to 40%, e.g., 20 to 40%, and in some embodiments at least 30% of all the $C_5$ alkylcarboxy esters are branched. In many embodiments, $C_{5-10}$ alkylcarboxy esters of neopentyl glycol and/or trimethylol propane are also present in the polyol ester lubricant composition.

The present lubricants have a kinematic viscosity at 40° C. of at least 32 cSt, 40 cSt, 46 cSt, 60 cSt or higher, and can be as high as 90, cSt, 100 cSt, 110, cSt, or 120 cSt. In most cases the viscosity at 40° C. will be from about 32 to about 120 cSt, e.g., from about 32 to 100 cSt, e.g., about 40 to about 100 cSt, or from about 46 to about 100 cSt. Generally, the lubricant of the invention has an ISO viscosity grade of from 32 to 100, 48 to 100, and will function well in systems requiring, for example, ISO viscosity grades of 48, 68, 100, or some value in between.

For example the polyol ester lubricant composition comprises a mixture of compounds of formula I $$\underset{R_1}{\overset{R_1}{\underset{|}{\overset{|}{\underset{O}{\overset{O}{\phantom{|}}}}}}}$$

R—O—[CH₂—C(CH₂—O—R₁)(CH₂—O—)]ₙ—R, (formula I, n repeating unit)

wherein n is an integer of from 1 to 20, for example, from 1 to 12, or 1 to 10, each R is independently an alkyl carbonyl of from 5 to 10 carbon atoms, wherein a majority are $C_5$ alkyl carbonyls of which about 15 to about 45% are branched, each $R_1$ is independently selected and is either a group R or a substituent of formula II:

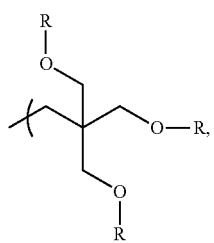

wherein the polyol ester lubricant composition comprises at least
a) a mono-pentaerythritol ester of formula I wherein n is 1 and each $R_1$ is independently selected and is a group R,
b) a di-pentaerythritol ester of formula I wherein n is 2 and each $R_1$ is independently selected and is a group R,
c) a tri-pentaerythritol ester of formula I, and
d) an esters of pentaerythritol oligomers formula I which comprise 4 or more pentaerythritol monomer groups.

At least 10% and up to about 60%, typically from about 10 to about 45% by weight, based on the combined weight of all neopentyl polyol esters, are compounds of formula I which are pentaerythritol oligomers of 4 or more pentaerythritol monomer groups. For example, in some embodiments at least 12%, 15%, 25%, or 30% by weight based on the combined weight of all neopentyl polyol esters, are a compound of formula I which are pentaerythritol oligomers of 4 or more pentaerythritol monomer groups. For example, from 12% to 45%, 15% to 45%, 25 to 45%, or 30 to 40% of all neopentyl polyol esters are made up of compounds of formula I which are pentaerythritol oligomers of 4 or more pentaerythritol monomer groups.

The polyol esters of the lubricant composition may consist of compounds of formula I, but in many embodiments the lubricant comprises a mixture of compounds of formula I with other neopentyl polyol esters, e.g., $C_{5-10}$ alkylcarboxylate esters of neopentyl glycol and/or trimethylol propane.

Although some commonly used polyol ester and polyvinyl ether lubricants are miscible with refrigerant R-32, or a refrigerant mixture which is predominately or essentially R-32, these lubricants have low viscosities, e.g., a kinematic viscosity at 40° C. of 32 cSt and are not as miscible at the wide temperature range as with lubricants of the present invention. Higher viscosity lubricants are preferred for many heat transfer systems, i.e., refrigeration, air conditioning etc., and in some cases required. Lubricants of the present invention have both the required range of R-32 miscibility and are available at the higher viscosities.

In the present application, "a" compound or "an" element means, unless otherwise specified, "one or more" compound or "element". "Majority" means 50% or more, typically more than 50%, and "predominately" means a significant majority, for example 70% or higher, in the case of the refrigerant, "predominately R-32" means that less than 15% by weight of the refrigerant is other than R-32, often less than 10% or 5%.

In one embodiment the composition polyol ester lubricant comprises:
a) from about 30 to about 85 wt %, e.g., from about 30 to about 80 wt %, $C_{5-10}$ alkylcarboxy esters of pentaerythritol,
b) from about 1 to about 20 wt % $C_{5-10}$ alkylcarboxy esters of di-pentaerythritol,
c) from about 1 to about 10 wt % $C_{5-10}$ alkylcarboxy esters of tri-pentaerythritol, and
d) from about 10 to about 45 wt % $C_{5-10}$ alkylcarboxy esters of pentaerythritol oligomers of 4 or more pentaerythritol monomer groups
wherein the wt % is based on all neopentyl polyol esters in the lubricant;
for example,
a) from about 30 to about 55 wt %, e.g., from about 40 to about 50 wt %, $C_{5-10}$ alkylcarboxy esters of pentaerythritol,
b) from about 1 to about 20 wt %, e.g., from about 10 to about 20 wt %, $C_{5-10}$ alkylcarboxy esters of di-pentaerythritol,
c) from about 1 to about 10 wt %, e.g., from about 3 to about 10 wt %, $C_{5-10}$ alkylcarboxy esters of tri pentaerythritol, and
d) from about 25 to about 45 wt %, e.g., from about 25 to about 45 wt %, $C_{5-10}$ alkylcarboxy esters of pentaerythritol oligomers of 4 or more pentaerythritol monomer groups,
wherein the wt % is based on all neopentyl polyol esters in the lubricant.

In another embodiment the polyol ester lubricant composition comprises:
(I) from about 50 to about 95% by weight, for example, from about 60 to about 90% by weight, based on all neopentyl polyol esters in the lubricant composition, of a mixture consisting of
a) from about 30 to about 55 wt %, e.g., from about 40 to about 50 wt %, $C_{5-10}$ alkylcarboxy esters of pentaerythritol,
b) from about 1 to about 20 wt %, e.g., from about 10 to about 20 wt %, $C_{5-10}$ alkylcarboxy esters of di-pentaerythritol,
c) from about 1 to about 10 wt %, e.g., from about 3 to about 10 wt %, $C_{5-10}$ alkylcarboxy esters of tri pentaerythritol, and
d) from about 25 to about 45 wt %, e.g., from about 25 to about 45 wt %, $C_{5-10}$ alkylcarboxy esters of pentaerythritol oligomers of 4 or more pentaerythritol monomer groups,
wherein the wt % is based on the weight of all esters of pentaerythritol, di-pentaerythritol, tri-pentaerythritol and oligomers comprising 4 or more pentaerythritol monomers,
and
(II) from about 5 to about 50% by weight, for example, from about 10 to about 40% by weight, based on all neopentyl polyol esters in the lubricant composition,
$C_{5-10}$ alkylcarboxy esters of neopentyl glycol and/or $C_{5-10}$ alkylcarboxy esters of trimethylol propane,
wherein 50 mole % or more of all the $C_{5-10}$ alkylcarboxy neopentyl polyol esters are linear or branched $C_5$ alkylcarboxy esters, and 15-40% of all the $C_5$ alkylcarboxy esters are branched.

In certain particular embodiments 75 mol % or more of all alkylcarboxy esters in the polyol ester lubricant composition comprises are linear or branched $C_5$ alkylcarboxy esters. In some embodiments, 25 to 75 mol % of all the $C_{5-10}$ alkylcarboxy neopentyl polyol esters in the polyol ester lubricant composition are branched.

In certain embodiments, 75 mol % or more of the alkylcarboxy esters of pentaerythritol, di-pentaerythritol, tri-pentaerythritol and oligomers comprising 4 or more pentaerythritol monomers are linear or branched $C_5$ alkylcarboxy esters.

In some embodiments, at least 50%, for example 60% for example 75% by weight of all esters in the polyol ester lubricant composition are compounds of formula I, in one embodiment, 90% or more are compounds of formula I. In other embodiments, 50%, 60%, 75%, 90% or more by weight of all esters in the polyol ester lubricant composition are esters of trimethylol propane or neopentyl glycol.

Each R is independently an alkyl carbonyl of 5 to 10 carbon atoms, which can be linear or branched, but at least 50% or more of all alkyl carbonyl groups are $C_5$ alkyl carbonyl, e.g., 60%, 75%, 90% or more of all alkyl carbonyl groups are pentanoyl. At least 15 molar % of the pentanoyl groups are branched. In one embodiment, a mixture of about 66% n-pentanoic acid and about 34% 2-methyl butanoic acid are used in the preparation of the polyol esters.

Other carboxylic acids are also often used in the preparation of the polyol esters, e.g., $C_6$, $C_7$, $C_8$, $C_9$ and/or $C_{10}$ carboxylic acids, may be used, however, the majority of all carboxylic acids, and hence the majority of all alkyl carbonyls of the polyol esters have 5 carbons.

From about 20 to about 65% of all alkyl carbonyl groups of the polyol esters are branched, for example 25 to 60%, for example 30 to 65% or 30 to 60% are branched.

It has been observed that the above lubricants containing a majority of pentanoyl groups and from 25 to 60% total branched alkyl carbonyl groups content have much improved miscibility with R-32 than similar lubricants containing larger amounts of linear or non-pentanoyl Alkyl carbonyl groups.

The compounds of formula I which are pentaerythritol oligomers can be linear or branched oligomers, i.e., linear or branched oligomeric backbones, as described in US 2011/0240910 and other compounds similar to those of formula I described above may be present in the working fluid. For example, incomplete esterification may lead to the presence of compounds wherein one or more R groups are hydrogen and higher oligomers showing greater degrees of branching are also possible depending on the synthetic method used.

The mixture of the above esters may be prepared by simple esterification of the appropriate polyols, e.g., pentaerythritol, di-pentaerythritol, and poly(pentaerythritol)s, however this requires obtaining the individual polyols as starting materials.

Often the polyol ester composition is more conveniently prepared by the two step process as generally described in US 2011/0240910.

The polyol esters ester can also be blended with other lubricants, such as polyalphaolefins, polyalkylene glycols, alkylated aromatics, polyvinyl ethers, mineral oils, other ester based lubricants, vegetable oils etc to form the lubricant composition. However, the mixture of polyol esters defined above is the majority, predominate or sole component of the lubricant composition used to prepare the working fluid and care must be used when adding other lubricant base stocks so that the desirable properties of the polyol ester composition relative to its use with the refrigerant is not diminished.

The working fluid of the invention comprises the above lubricant and a refrigerant comprising R-32. The refrigerant may be a mixture of more than one HFC compound or contain non HFC compounds, but in generally the refrigerant is predominately R-32. For example, other refrigerants which may be present in the working fluid include $CO_2$, ammonia and the like, but at least 85 wt %, and often more, of the refrigerant is HFC, typically at least 90%, and often more, of the refrigerant is R-32.

The mixing ratio of the polyol ester lubricant to the refrigerant is not particularly restricted, but the lubricant may be present in a ratio of 1 to 500 parts by weight, more preferably 2 to 400 parts by weight per 100 parts by weight of the refrigerant. In one embodiment the working fluid comprises about 5 to 20 weight percent of the ester lubricant based on the weight of lubricant and refrigerant.

The working fluids of the invention can comprise other components common to the art, including additives, other lubricants etc. Common additives which may also be present in the working fluid include antioxidants, extreme-pressure additives, antiwear additives, friction reducing additives, defoaming agents, profoaming agents, metal deactivators, acid scavengers and the like.

Examples of the antioxidants that can be used include phenolic antioxidants such as 2,6-di-t-butyl-4-methylphenol and 4,4'-methylenebis(2,6-di-t-butylphenol); amine antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-containing antioxidants such as alkyl disulfide, thiodipropionic acid esters and benzothiazole; and zinc dialkyl dithiophosphate and zinc diaryl dithiophosphate.

Examples of the extreme-pressure additives, antiwear additives, friction reducing additives that can be used include zinc compounds such as zinc dialkyl dithiophosphate and zinc diaryl dithiophosphate; sulfur compounds such as thiodipropinoic acid esters, dialkyl sulfide, dibenzyl sulfide, dialkyl polysulfide, alkylmercaptan, dibenzothiophene and 2,2'-dithiobis(benzothiazole); sulfur/nitrogen ashless antiwear additives such as dialkyldimercaptothiadiazoles and methylenebis(N,N-dialkyldithiocarbamates); phosphorus compounds such as triaryl phosphates such as tricresyl phosphate and trialkyl phosphates; dialkyl or diaryl phosphates; trialkyl or triaryl phosphites; amine salts of alkyl and dialkylphosphoric acid esters such as the dodecylamine salt of dimethylphosphoric acid ester; dialkyl or diaryl phosphites; monoalkyl or monoaryl phosphites; fluorine compounds such as perfluoroalkyl polyethers, trifluorochloroethylene polymers and graphite fluoride; silicon compounds such as a fatty acid-modified silicone; molybdenum disulfide, graphite, and the like. Examples of organic friction modifiers include long chain fatty amines and glycerol esters.

Examples of the defoaming and profoaming agents that can be used include silicone oils such as dimethylpolysiloxane and organosilicates such as diethyl silicate. Examples of the metal deactivators that can be used include benzotriazole, tolyltriazole, alizarin, quinizarin and mercaptobenzothiazole. Furthermore, epoxy compounds such as phenyl glycidyl ethers, alkyl glycidyl ethers, alkylglycidyl esters, epoxystearic acid esters and epoxidized vegetable oil, organotin compounds and boron compounds may be added as acid scavengers or stabilizers.

Examples of moisture scavengers include trialkylorthoformates such as trimethylorthoformate and triethylorthoformate, ketals such as 1,3-dioxacyclopentane, and amino ketals such as 2,2-dialkyloxazolidines.

The working fluids comprising the present polyol esters and a refrigerant can be used in a wide variety of refrigeration and heat energy transfer applications. Non-limiting examples include all ranges of air conditioning equipment from small window air conditioners, centralized home air conditioning units to light industrial air conditioners and large industrial units for factories, office buildings, apartment buildings and warehouses. Refrigeration applications include small home appliances such as home refrigerators, freezers, water coolers, vending machines and icemakers to large scale refrigerated warehouses and ice skating rinks. Also included in industrial applications would be cascade grocery store refrigeration and freezer systems. Heat energy transfer applications include heat pumps for house hold heating and hot water heaters. Transportation related applications include automotive and truck air conditioning, refrigerated semi-trailers as well as refrigerated marine and rail shipping containers.

Types of compressors useful for the above applications can be classified into two broad categories; positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, rotary (rolling piston, rotary vane, single screw, twin screw), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

EXAMPLES

Working fluids comprising difluoromethane, i.e., R-32, and lubricants were prepared and the R-32/lubricant miscibility was determined at various temperatures wt %. Examples 1-8 were prepared using esters mixtures of pentaerythritol, di-pentaerythritol, tri-pentaerythritol and oligomers comprising 4 or more pentaerythritol monomers (PolyPE) of the invention shown in Table 1.

In the following examples, i-C5 is an ~66/34 mixture of pentanoic acid/2-methylbutanoic acid, i-C9 is 3,5,5-trimethylhexanoic acid, PE is pentaerythritol, DiPE is dipentaerythritol, PVE is poly vinyl ether, and PolyPE is a mixture of pentaerythritol, di-pentaerythritol, tri-pentaerythritol and oligomers comprising 4 or more pentaerythritol monomers wherein at least 10% by weight of the mixture is oligomers of PE oligomers of at least 4 PE monomer units

TABLE 1

| | | KV | | | Mol % Carboxylic Acid | | | | % C5 | % Br'd Acid | |
|---|---|---|---|---|---|---|---|---|---|---|---|
| Ex | Polyol | 40° C. | 100° C. | VI | nC5 | iC5 | nC7 | iC9 | Acid | C5 * | All** |
| 1 | PolyPE | 46.8 | 7.5 | 125 | 0 | 95 | 0 | 5 | 95% | 33% | 37% |
| 2 | PolyPE | 57.7 | 8.9 | 132 | 0 | 95 | 0 | 5 | 95% | 33% | 37% |
| 3 | PolyPE | 68.7 | 9.8 | 125 | 0 | 94 | 1 | 5 | 94% | 33% | 37% |
| 4 | PolyPE | 93.5 | 12.3 | 126 | 0 | 95 | 0 | 5 | 95% | 33% | 37% |
| 5 | PolyPE | 53.3 | 8.1 | 121 | 0 | 85 | 0 | 15 | 85% | 33% | 44% |
| 6 | PolyPE | 63.8 | 9.1 | 120 | 0 | 85 | 0 | 15 | 85% | 33% | 44% |
| 7 | PolyPE | 76.0 | 10.3 | 119 | 0 | 85 | 0 | 15 | 85% | 33% | 44% |
| 8 | PolyPE | 55.4 | 8.1 | 116 | 0 | 75 | 0 | 25 | 75% | 33% | 50% |

* % Br'd Acid C5 is the percentage of pentanoyl groups that are branched
** % Br'd Acid All is the percentage of all alkanoyl groups that are branched As i-C5 is an ~2:1 mixture of pentanoic acid/2-methylbutanoic acid, in Example 1, ~66% of $C_5$ alkyl carbonyl groups are derived from n-pentanoic acid and 33% are derived from 2-methylbutanoic acid.

Comparative Examples A-I were prepared using the polyol ester lubricants outside of the invention, shown in Table 2.

TABLE 2

| | | KV | Mol % Carboxylic Acid | | | | % C5 | % Br'd Acid | |
|---|---|---|---|---|---|---|---|---|---|
| Ex | Polyol | 40° C. | nC5 | iC5 | nC7 | iC9 | Acid | C5 | All |
| A | PolyPE | 70.9 | 75 | 0 | 0 | 25 | 75% | 0% | 25% |
| B | PolyPE | 68.5 | 97 | 1 | 1 | 1 | 98 | >1% | 13% |
| C | PolyPE | 55.0 | 0 | 50 | 25 | 25 | 50% | 33% | 42% |
| D | PE | 64.9 | 0 | 27 | 5 | 68 | 27% | 33% | 77% |
| E | PE | 46.2 | 0 | 39 | 10 | 51 | 39 | 33% | 64% |
| F | PE | 32.0 | 32 | 0 | 33 | 35 | 32% | 0% | 35% |
| G | DiPE + PE | 30.0 | 43 | 0 | 41 | 16 | 43% | 0% | 16% |
| H | PVE | 68.0 | — | — | — | — | — | — | — |
| I | PVE | 32.0 | — | — | — | — | — | — | — |

Table 3 lists the temperatures above which lubricant/R-32 miscibility is observed for the above working fluids at various lubricant wt %. Two phases are apparent at the listed lubricant wt % when the temperature drops below that shown.

TABLE 3

| | ISO | % C5 | % branched | Miscible Above (deg C.) | | | | |
|---|---|---|---|---|---|---|---|---|
| EX | Grade | Acid | Acid | Content | 5% | 10% | 20% | 30% | 60% |
| 1 | 46 | 95% | 37% | — | −28 | −32 | −38 | −61 |
| 2 | 55 | 95% | 37% | −18 | −15 | −23 | −30 | −55 |
| 3 | 68 | 94% | 37% | −11 | −6 | −16 | −24 | −55 |
| 4 | 100 | 95% | 37% | −62 | −5 | −3 | −18 | −61 |
| 5 | 55 | 85% | 44% | −25 | −22 | −20 | −26 | −61 |
| 6 | 68 | 85% | 44% | −21 | −17 | −12 | −15 | −47 |
| 7 | 80 | 85% | 44% | −9 | −8 | −7 | −15 | −45 |
| 8 | 55 | 75% | 51% | −26 | −18 | −17 | −19 | −45 |
| A | 68 | 75% | 25% | −55 | 7 | 10 | 2 | −49 |
| B | 68 | 98% | 13% | −12 | N.M. | N.M. | — | −45 |
| C | 55 | 50% | 42% | 5 | N.M. | N.M. | N.M. | −29 |
| D | 68 | 27% | 78% | −20 | 0 | 15 | 9 | −21 |
| E | 46 | 39% | 64% | −24 | −12 | 4 | 5 | −25 |
| F | 32 | 32% | 35% | −16 | 2 | 21 | N.M. | −25 |
| G | 32 | 43% | 16% | −20 | 2 | N.M. | N.M. | −33 |

TABLE 3-continued

| | ISO | % C5 | % branched | Miscible Above (deg C.) | | | | |
|---|---|---|---|---|---|---|---|---|
| EX | Grade | Acid | Acid | Content | 5% | 10% | 20% | 30% | 60% |
| H | 68 | — | — | — | −10 | 15 | N.M. | N.M. | −24 |
| I | 32 | — | — | — | −17 | 3 | 10 | 10 | −23 |

N.M. stands for not miscible.

A basic requirement for many refrigeration lubricants is that it form a single phase with the refrigerant at all concentrations above 0° C. From the data above, this is achieved with each of the lubricants of Examples 1-8, but not those of Comparative Examples A-I.

In Examples 9-14 highly miscible lubricants from the Examples above were blended with non-PolyPE neopentyl ester lubricants and the R-32/lubricant miscibility was determined at various temperatures and wt %. Table 4 lists the acids from which the carboxylates are derived, some rounding errors are seen. The ratios shown are wt ratios. Table 5 lists the miscibility results.

Examples 9-11 use 1:2, 1:1, and 1:2 mixtures of the lubricant from Ex 3 with the lubricant of Comparative Ex E.

Example 12 uses a 1:1 mixture of the lubricant of Ex 3 with a pentaerythritol ester derived from a 72:28 mixture of n-pentanoic acid: 3,5,5-trimethylhexanoic acid.

Example 13 uses a 4:1 mixture of the lubricant from Ex 3 with n-heptanoyl esters of neo-pentyl glycol.

Example 14 uses a mixture of the lubricant from Ex 3 with an amount n-heptanoyl esters of neo-pentyl glycol to achieve an ISO grade of 46.

TABLE 4

Blends of the lubricant of Example 3 with non Poly PE esters (NP).

| EX | NP | Ratio Ex3:NP | ISO Gr | Mol % Carboxylic Acid | | | | % C5 Acid | % Br'd C5 | % Br'd All |
|----|----|----|----|----|----|----|----|----|----|----|
|  |  |  |  | nC5 | iC5 | nC7 | iC9 |  |  |  |
| 9  | Ex E | 1:2 | 68 | 0 | 75 | 2 | 23 | 75% | 33% | 48% |
| 10 | Ex E | 1:2 | 68 | 0 | 64 | 3 | 33 | 64% | 33% | 55% |
| 11 | Ex E | 1:1 | 68 | 0 | 52 | 4 | 44 | 52% | 33% | 62% |
| 12 | PE   | 1:1 | 46 | 34 | 50 | 1 | 16 | 79% | 20% | 33% |
| 13 | NPG  | 4:1 | 32 | 0 | 75 | 21 | 4 | 75% | 33% | 30% |
| 14 | NPG  |     | 46 |   |    |    |   |     |     |     |

TABLE 5

Miscibility data for blends of the lubricant of Example 3 with non Poly PE esters (NP).

| EX | NP | Ratio EX2:NP | ISO Grade | Miscible Above (deg C.) | | | | |
|----|----|----|----|----|----|----|----|----|
|  |  |  |  | 5% | 10% | 20% | 30% | 60% |
| 9  | Ex E | 2:1 | 68 | −22 | −9  | −8  | −15 | −50 |
| 10 | Ex E | 1:1 | 68 | −26 | −6  | −4  | −8  | −48 |
| 11 | Ex E | 1:2 | 68 | −32 | −14 | 2   | 0   | −38 |
| 12 | PE   | 1:1 | 46 | −34 | −20 | −19 | −24 | −45 |
| 13 | NPG  | 4:1 | 32 | −24 | −19 | −17 | −21 | −45 |
| 14 | NPG  |     | 46 | −17 | −15 | −20 | −29 | −63 |

A basic requirement for many refrigeration lubricants is that it must form a single phase with the refrigerant at all concentrations above 0° C. From the data above, this is achieved with each of the blends of Examples 8-16.

What is claimed:

1. A working fluid for a heat transfer device comprising:
   i) a hydrofluorocarbon refrigerant comprising difluoromethane (R-32) and
   ii) a polyol ester lubricant composition having a kinematic viscosity at 40° C. of from 32 to 100 cSt and comprising a mixture of $C_{5-10}$ alkylcarboxy neopentyl polyol esters, said neopentyl polyol esters comprising a mixture of $C_{5-10}$ alkylcarboxy esters of pentaerythritol, di-pentaerythritol, tri-pentaerythritol and oligomers comprising 4 or more pentaerythritol monomers,
wherein at least 10 wt % of all neopentyl polyol esters are esters of oligomers containing 4 or more neopentyl polyol monomer units, and
wherein 75 mole % or more of all the $C_{5-10}$ alkylcarboxy esters of pentaerythritol, di-pentaerythritol, tri-pentaerythritol and oligomers comprising 4 or more pentaerythritol monomers are linear or branched $C_5$ alkylcarboxy esters, and 15-40% of all the $C_5$ alkylcarboxy esters are branched.

2. The working fluid according to claim 1 wherein the polyol ester lubricant composition further comprises $C_{5-10}$ alkylcarboxy esters of neopentyl glycol and/or $C_{5-10}$ alkylcarboxy esters of trimethylol propane wherein at least 10 wt % of all neopentyl polyol esters are esters of oligomers containing 4 or more neopentyl polyol monomer units, and 50 mole % or more of all the $C_{5-10}$ alkylcarboxy neopentyl polyol esters are linear or branched $C_5$ alkylcarboxy esters, and 15-40% of all the $C_5$ alkylcarboxy esters are branched.

3. The working fluid according to claim 1 wherein the polyol ester lubricant composition comprises:
   a) from about 30 to about 85 wt % $C_{5-10}$ alkylcarboxy esters of pentaerythritol,
   b) from about 1 to about 20 wt % $C_{5-10}$ alkylcarboxy esters of di-pentaerythritol,
   c) from about 1 to about 10 wt % $C_{5-10}$ alkylcarboxy esters of tri-pentaerythritol, and
   d) from about 10 to about 45 wt % $C_{5-10}$ alkylcarboxy esters of pentaerythritol oligomers of 4 or more pentaerythritol monomer groups
wherein the wt % is based on all neopentyl polyol esters in the lubricant.

4. The working fluid according to claim 3 wherein the polyol ester lubricant composition comprises:
   a) from about 30 to about 55 wt % $C_{5-10}$ alkylcarboxy esters of pentaerythritol,
   b) from about 1 to about 20 wt % $C_{5-10}$ alkylcarboxy esters of di-pentaerythritol,
   c) from about 1 to about 10 wt % $C_{5-10}$ alkylcarboxy esters of tri pentaerythritol, and
   d) from about 25 to about 45 wt % $C_{5-10}$ alkylcarboxy esters of pentaerythritol oligomers of 4 or more pentaerythritol monomer groups,
wherein the wt % is based on all neopentyl polyol esters in the lubricant.

5. The working fluid according to claim 3 wherein the polyol ester lubricant composition comprises:
   (I) from about 50 to about 95% by weight, based on all neopentyl polyol esters in the lubricant composition, a mixture consisting of
      a) from about 30 to about 55 wt % $C_{5-10}$ alkylcarboxy esters of pentaerythritol,
      b) from about 1 to about 20 wt % $C_{5-10}$ alkylcarboxy esters of di-pentaerythritol,
      c) from about 1 to about 10 wt % $C_{5-10}$ alkylcarboxy esters of tri pentaerythritol, and
      d) from about 25 to about 45 wt % $C_{5-10}$ alkylcarboxy esters of pentaerythritol oligomers of 4 or more pentaerythritol monomer groups, wherein the wt % is based on the weight of all esters of pentaerythritol, di-pentaerythritol, tri-pentaerythritol and oligomers comprising 4 or more pentaerythritol monomers, and (II) from about 5 to about 50% by weight, based on all neopentyl polyol esters in the lubricant composition, $C_{5-10}$ alkylcarboxy esters of neopentyl glycol and/or $C_{5-10}$ alkylcarboxy esters of trimethylol propane, wherein 50 mole % or more of all the $C_{5-10}$ alkylcarboxy neopentyl polyol esters are linear or branched $C_5$ alkylcarboxy esters, and 15-40% of all the $C_5$ alkylcarboxy esters are branched.

6. The working fluid according to claim 5 wherein the polyol ester lubricant composition comprises (I) from about 60 to about 90% by weight, based on all neopentyl polyol esters in the lubricant composition, of the mixture consisting of a), b), c), and d), and (II) from about 10 to about 40% by weight, based on all neopentyl polyol esters in the lubricant composition, $C_{5-10}$ alkylcarboxy esters of neopentyl glycol and/or $C_{5-10}$ alkylcarboxy esters of trimethylol propane.

7. The working fluid according to claim 5 wherein from 25 to 60 mol % of all the $C_{5-10}$ alkylcarboxy neopentyl polyol esters are branched.

8. The working fluid according to claim 3 wherein from 25 to 60 mol % of all the $C_{5-10}$ alkylcarboxy neopentyl polyol esters are branched.

9. The working fluid according to claim 1 wherein the polyol ester lubricant has a kinematic viscosity at 40° C. of from 46 to 100 cSt.

10. The working fluid according to claim 1 wherein the polyol ester lubricant has a kinematic viscosity at 40° C. of from 68 to 100 cSt.

11. The working fluid according to claim 1 wherein the hydrofluorocarbon refrigerant comprises R-32 and less than 15% by weight of the refrigerant is other than R-32 and is selected from other HFC refrigerants, $CO_2$, ammonia and hydrocarbon refrigerants.

12. The working fluid according to claim 11 wherein the hydrofluorocarbon refrigerant comprises R-32 and less than 10% by weight of the refrigerant is other than R-32.

13. The working fluid according to claim 12 wherein the hydrofluorocarbon refrigerant consists essentially of R-32.

14. The working fluid according to claim 1 further comprising in addition to components i) and ii), one or more of a mineral oil, poly-α-olefin, alkylbenzenes, carboxylic acid ester other than the neopentyl polyol ester of component ii), polyether, polyvinyl ether, perfluoropolyether, phosphoric acid ester or mixture thereof.

15. The working fluid according to claim 1 further comprising one or more antioxidant, extreme-pressure additive, antiwear additive, friction reducing additive, defoaming agent, profoaming agent, metal deactivator, acid scavenger or mixture thereof.

* * * * *